US011809345B2

(12) United States Patent
Giovannini et al.

(10) Patent No.: US 11,809,345 B2
(45) Date of Patent: Nov. 7, 2023

(54) DATA-BUFFER COMPONENT WITH VARIABLE-WIDTH DATA RANKS AND CONFIGURABLE DATA-RANK TIMING

(71) Applicant: Rambus Inc., San Jose, CA (US)

(72) Inventors: Thomas J. Giovannini, San Jose, CA (US); John Eric Linstadt, Palo Alto, CA (US); Catherine Chen, Cupertino, CA (US)

(73) Assignee: Rambus Inc., San Jose, CA (US)

( * ) Notice: Subject to any disclaimer, the term of this patent is extended or adjusted under 35 U.S.C. 154(b) by 0 days.

(21) Appl. No.: 17/677,714

(22) Filed: Feb. 22, 2022

(65) Prior Publication Data

US 2022/0245073 A1 Aug. 4, 2022

Related U.S. Application Data

(63) Continuation of application No. 17/021,024, filed on Sep. 15, 2020, now Pat. No. 11,275,702, which is a
(Continued)

(51) Int. Cl.
*G06F 13/16* (2006.01)
*G06F 13/42* (2006.01)
*G06F 13/40* (2006.01)

(52) U.S. Cl.
CPC ...... *G06F 13/1689* (2013.01); *G06F 13/1673* (2013.01); *G06F 13/1678* (2013.01); *G06F 13/4022* (2013.01); *G06F 13/4265* (2013.01)

(58) Field of Classification Search
None
See application file for complete search history.

(56) References Cited

U.S. PATENT DOCUMENTS 6,154,821 A  11/2000  Barth et al.
6,643,752 B1  11/2003  Donnelly et al.
(Continued)

OTHER PUBLICATIONS

Elpida Memory, Inc., New Features of DDR3 SDRAM, User's Manual, Mar. 2009, Document No. E1503E10 (Ver. 1.0), 18 pgs.
(Continued)

*Primary Examiner* — Henry Tsai
*Assistant Examiner* — Aurangzeb Hassan
(74) *Attorney, Agent, or Firm* — Silicon Edge Law Group LLP; Arthur J. Behiel (57) ABSTRACT

A memory system supports single- and dual-memory-module configurations, both supporting point-to-point communication between a host (e.g., a memory controller) and the memory module or modules. Each memory module includes an address-buffer component, data-buffer components, and two sets of memory dies, each set termed a "timing rank," that can be accessed independently. The one memory module is configured in a wide mode for the single-memory-module configuration, in which case both timing ranks work together, as a "package rank," to communicate full-width data. Each of two memory modules are configured in a narrow mode for the dual-memory-module configuration, in which case one timing rank from each memory module communicates data in parallel to appear to the host as single package ranks. The data-buffer components support separate and configurable write and read delays for the different timing ranks on each module to provide read and write leveling within and between memory modules.

20 Claims, 7 Drawing Sheets

Related U.S. Application Data continuation of application No. 15/701,698, filed on Sep. 12, 2017, now Pat. No. 10,789,185.

(60) Provisional application No. 62/397,343, filed on Sep. 21, 2016.

(56) References Cited

U.S. PATENT DOCUMENTS

| | | |
|---|---|---|
| 7,275,201 B1 | 9/2007 | Porat et al. |
| 7,383,416 B2 | 6/2008 | Oeschay et al. |
| 7,539,812 B2 | 5/2009 | Tetrick |
| 7,694,093 B2 | 4/2010 | Shaw et al. |
| 8,386,722 B1 | 2/2013 | Wang et al. |
| 8,738,853 B2 | 5/2014 | Amer et al. |
| 8,819,356 B2 | 8/2014 | Rajan et al. |
| 9,015,408 B2 | 4/2015 | Amer et al. |
| 9,025,409 B2 | 5/2015 | Shaeffer |
| 9,142,281 B1 | 9/2015 | Giovannini et al. |
| 9,232,651 B2 | 1/2016 | Ware et al. |
| 9,287,003 B2 | 3/2016 | Gopalakrishnan et al. |
| 2001/0009531 A1 | 7/2001 | Farmwald et al. |
| 2001/0023466 A1 | 9/2001 | Farmwald et al. |
| 2003/0158981 A1 | 8/2003 | LaBerge |
| 2004/0054845 A1 | 3/2004 | Ware et al. |
| 2005/0166026 A1 | 7/2005 | Ware et al. |
| 2007/0005877 A1 | 1/2007 | Tetrick |
| 2007/0258491 A1* | 11/2007 | Reitlingshoefer ...... H04L 7/033 370/535 |
| 2008/0201548 A1* | 8/2008 | Przybylski ............... G11C 7/10 711/E12.001 |
| 2009/0024903 A1 | 1/2009 | Bueb |
| 2009/0040082 A1 | 2/2009 | Hinz et al. |
| 2009/0258491 A1 | 10/2009 | Hamm et al. |
| 2011/0066822 A1 | 3/2011 | Ikeda |
| 2011/0095783 A1* | 4/2011 | Ferolito ............. G06F 13/4086 326/30 |
| 2011/0194364 A1 | 8/2011 | Nirschl et al. |
| 2012/0065813 A1* | 3/2012 | Nguyen ............ H04B 7/18519 701/2 |
| 2012/0176850 A1 | 7/2012 | Do et al. |
| 2012/0239874 A1 | 9/2012 | Lee et al. |
| 2013/0104000 A1 | 4/2013 | Bueb |
| 2013/0128678 A1 | 5/2013 | Pyeon |
| 2014/0119148 A1 | 5/2014 | Earle |
| 2014/0149631 A1 | 5/2014 | Kim et al. |
| 2014/0192583 A1* | 7/2014 | Rajan ..................... G11C 7/10 365/63 |
| 2014/0223054 A1 | 8/2014 | Hasan et al. |
| 2015/0078109 A1 | 3/2015 | Kamibeppu |
| 2015/0223333 A1 | 8/2015 | Ware et al. |
| 2015/0294698 A1 | 10/2015 | Takefman et al. |
| 2015/0318059 A1 | 11/2015 | Dragula et al. |
| 2016/0055898 A1 | 2/2016 | Ruan et al. |
| 2016/0092383 A1* | 3/2016 | Bains .................... G06F 13/287 710/308 |
| 2017/0017587 A1 | 1/2017 | West et al. |
| 2017/0093400 A1* | 3/2017 | Bains ................... G06F 3/0673 |
| 2017/0115891 A1 | 4/2017 | O'Krafka et al. |

OTHER PUBLICATIONS

Jedec Solid State Technology Association, LRDIMM DDR3 Memory Buffer (MB) Version 1.0, JESD82-30, Oct. 2014, 321 pages.

* cited by examiner

FIG. 7

DATA-BUFFER COMPONENT WITH VARIABLE-WIDTH DATA RANKS AND CONFIGURABLE DATA-RANK TIMING

BACKGROUND

Personal computers, workstations, and servers are general-purpose devices that can be programmed to automatically carry out arithmetic or logical operations. These devices include at least one processor, such as a central processing unit (CPU), and some form of memory system. The processor executes instructions and manipulates data stored in the memory.

Memory systems commonly include a memory controller that communicates with some number of memory modules via multi-wire physical connections called "channels." Each memory module commonly includes dynamic random access memory (DRAM) components mounted on a printed circuit board. Successive generations of DRAM components have benefitted from steadily shrinking lithographic feature sizes. Storage capacity and signaling rates have improved as a result. Emerging memory technologies are expected to continue these beneficial trends.

One metric of memory-system design that has not shown comparable improvement is the number of modules one can connect to a single channel. Adding a module to a channel increases the "load" on that channel, and thus degrades signaling integrity and limits signal rates. The number of modules per memory channel has thus eroded with increased signaling rates. There is therefore a demand for memory modules that can extend memory resources without unduly limiting signal rates.

DETAILED DESCRIPTION

Figure 1:
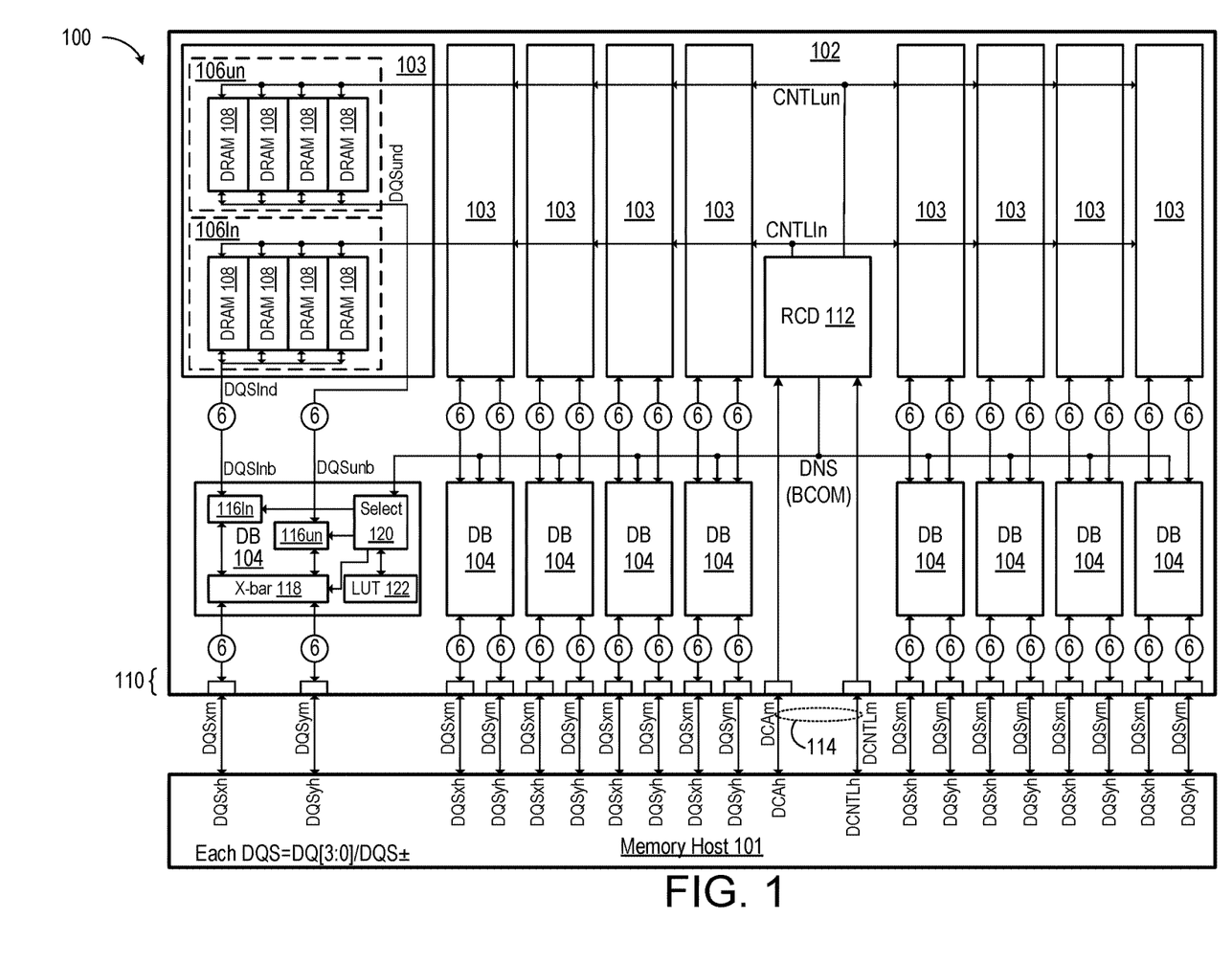
FIG. 1 depicts a memory system 100 in which a memory host 101 is coupled to a memory module 102 that can be configured to support different data widths.

FIG. 1 depicts a memory system 100 that supports read and write data leveling in accordance with one embodiment. A memory host 101, such as a controller, is connected to a memory module 102 to write data to and read data from a collection of DRAM dies 108. Host 101 communicates both write and read data via eighteen data nibbles DQSxh and DQSyh, and directs this communication by issuing command, address, timing, and control signals DCAh and DCNTLh via a control interface 114. These signal names bear the suffix "h" for "host" to distinguish them from the same signals DQSxm, DQSym, DCAm, and DCNTLm that are separated in time from the host signals by different propagation delays.

The timing between the arrival of control signals at DRAM dies 108 and the arrival of data is important to ensure successful writes. The different propagation delays experienced by the various nibbles and control signals are therefore managed to satisfy the timing needs of the memory. In a process called "write leveling," host 101 and module 102 work together to calibrate the timing of write data on each data nibble DQSxm and DQSym relative to the timing and control signals DCAm and DCNTLm. Likewise, in a process called "read leveling," system 100 calibrates the timing of read data on each data nibble DQSxh and DQSyh relative to the timing and control signals DCAh and DCNTLh to ensure read data is successfully captured at host 101. Each data nibble DQSxm and DQSym can support multiple write- and read-leveling delays to accommodate different access delays for memory devices that communicate via that nibble.

The connections between host 101 and memory module 102 are six-bits wide, four bits DQ[3:0] for data and two bits DQS± for a complementary strobe signal that conveys timing information in the direction of data flow. For ease of illustration, the data-and-strobe nodes and signals of the type DQ[3:0]/DQS± are generally abbreviated to DQS in the figures. For example, the data and strobe signals to and from memory module 102 are abbreviated DQSxm and DQSym.

Memory module 102 can be configured to support different data widths. In this example, memory module 102 supports a first mode in which memory module 102 communicates nine eight-bit data bytes (72 data bits) in parallel, and is compatible with what is conventionally termed a "DDR4 LRDIMM chipset." DDR4 (for "double-data-rate, version 4") is a type of dynamic, random-access memory (DRAM) die, and LRDIMM (for "load-reduced, dual inline memory module") is a type of memory module that employs a separate system of buffers to facilitate communication with the memory dies. This backward compatibility allows memory module 102 to support an enormous and growing range of memory systems. Memory module 102 additionally supports a second, relatively narrow mode in which memory module 102 communicates nine four-bit data nibbles (36 data bits) in parallel. Multiple memory modules 102, each configured in the relatively narrow mode, can be used together to increase system memory capacity while maintaining signaling integrity and high signaling rates.

Memory module 102 includes nine byte-wide memory groups 103, each with a corresponding data-buffer (DB) component 104. Each memory group 103 includes a pair of DRAM packages 106$un$ and 106$ln$, for which the suffixes "un" and "ln" respectively refer to "upper nibble" and "lower nibble." Given eight-bit data, the upper and lower nibbles refer to the most-significant four-bits and the least-significant four bits, respectively. In this example, the upper-nibble DRAM package 106$un$ is connected to DB component 104 via relatively long signal paths in comparison with DRAM package 106$ln$, so write and read data conveyed to and from DRAM package 106$un$ experience more delay. Per-nibble timing disparities can also be due to e.g. device-level skews and training errors. If unaccounted for, these timing disparities can lead to read and write errors.

In standard LRDIMM modules, memory host 101 manages per-nibble timing disparities during read and write leveling. In read leveling, host 101 adjusts the capture timing of signals DQSxh and DQSyh, with one leveling delay per chip select (or package rank) per host-side nibble. In this context, "package rank" refers to a set of eighteen DRAM dies 108, also called "chips," that memory host 101 expects to access responsive to a host-side chip-select signal issued over control interface 114. In the example of FIG. 1, each package rank consists of one DRAM die 108 from each of the nine upper-nibble packages 106*un* and lower-nibble packages 106*ln*. In write leveling, host 101 adjusts signal timings so that signals on module control busses CNTLun and CNTLln arrive at DRAM dies 108 correctly timed to corresponding data signals DQSund and DQSlnd.

The narrow mode allows two modules 102 to work together to communicate full-width data with host 101, with each module communicating thirty-six of the seventy-two data bits. To accommodate narrow data, memory module 102 divides each eighteen-die package rank into a pair of independently accessible nine-die timing ranks. In this context, a "timing rank" is a rank of DRAM devices associated with a DRAM-side chip select. For example, each DRAM die 108 of upper-nibble packages 106*un* can be a member of a nine-die timing rank; likewise, each DRAM die 108 of lower-nibble packages 106*ln* can be a member of a nine-die timing rank. Timing ranks can require different leveling delays, and the leveling capability of memory module 102 is extended to include different delays through alternative nibble paths through DB components 104.

DRAM packages 106*un* and 106*ln* communicate data-and-strobe signals DQSund and DQSlnd with corresponding ports DQSunb and DQSlnb of DB component 104. For these ports and their corresponding signals, the labels ending in "d" designate DRAM-side ports and signals, whereas the labels ending in "b" designate buffer-side ports and signals. These distinctions facilitate illustrations of propagation delays between components. In general, signals and their associated nodes carry the same designations; whether a given label refers to a signal or a corresponding node will be clear from the context.

Module 102 can have more or fewer ranks or packages, packages 106 can include more or fewer DRAM dies, and each rank, package, or die can include more or less memory than depicted in these examples. Each package or die can further include an integrated signal buffer to minimize loading on the DRAM die communication ports. In this example, however, each package 106 includes four DRAM dies 108 connected to the same data and strobe ports, with each potentially experiencing different signal delays.

Memory host 101 directs command, address, and control signals on primary ports DCAh and DCNTLh to control the flow of data to and from memory module 102. As in the case of data and strobes, the letter "h" designates these signals and ports as pertaining to memory host 101 to distinguish them from corresponding signals DCAm and DCNTLm that appear at memory module 102 after a propagation delay.

A command/address-buffer component 112, alternatively called a "Registering Clock Driver" (RCD), selectively interprets and retransmits these signals to communicate appropriate command, address, control, and clock signals to upper-nibble packages 106*un* via a first memory-component control interface CNTLun and to lower-nibble package 106*ln* via a second memory-component control interface CNTLln. Chip-select signals CS on each interface CNTLun and CNTLln allow RCD 112 to select individual dies 108 in each DRAM package 106*un* and 106*ln*. In particular, RCD 112 translates chip-select and chip ID information from memory host 101 into DRAM-side chip-select signals on one or both of control interfaces CNTLun and CNTLln.

RCD 112 additionally decodes chip-select information from host 101 to control a delay-and-nibble-select signal DNS on buffer-control bus BCOM, and in this way steers and times the flow of data as appropriate to read and write level the nibbles of selected package or timing ranks. In the full-width mode, RCD 112 uses each of control interfaces CNTLun and CNTLln to select one of DRAM dies 108 in each of the nine memory groups 103, one in each upper-nibble package 106*un* and one in each lower-nibble package 106*ln*, and DB components 104 each communicate eight-wide data from their respective pair of selected DRAM dies 108. The nine DB components 104 thus collectively communicate eight-wide data from eighteen DRAM dies 108—a package rank—for a total of 72 data bits. Of these, 64 bits are encoded into 72 signals, with the additional eight bits allowing for error detection and correction.

In the narrower second mode, RCD 112 employs only one of control interfaces CNTLun and CNTLln to select one DRAM die 108 in each of the nine memory groups 103, either in the upper-nibble packages 106*un* or in the lower-nibble packages 106*ln*. RCD 112 controls the nine DB components 104 to select a rank of nine DRAM dies 108—a timing rank—for each memory access to communicate 36-bit data in parallel over nine of the eighteen nibble-wide module ports (e.g., only the nine four-bit module ports DQSym). As detailed below in connection with FIG. 5B, two memory modules 102 configured in the half-width mode, each delivering 36-bit data from one timing rank, appear to memory host 101 as a single module communicating via package ranks.

Addresses associated with the commands on module port DCAm of control interface 114 identify target collections of memory cells (not shown) in DRAM dies 108. Chip-select signals on primary port DCNTLm and associated with the commands on module port DCAm allow RCD 112 to select individual integrated-circuit DRAM dies, or "chips," for both access and power-state management. DB components 104 and RCD 112 each acts as a signal buffer to reduce loading on module connector 110. DB components 104 are disposed across the bottom of memory module 102 to minimize conductor lengths and concomitant skew between data bits. DB components 104 provide load isolation for read, write, and strobe signals to and from packages 106, and each receives delay-and-nibble select signals DNS that direct the steering and timing of data and strobe signals between DRAM dies 108 and module connector 110.

From the perspective of memory host 101, and absent calibration, memory host 101 will see different read and write delays for the upper- and lower-nibble DRAM packages 106*un* and 106*ln*. DB component 104 compensates for this disparity using a pair of nibble-wide configurable delay elements 116*ln* and 116*un*. The delays through configurable delay elements 116*ln* and 116*un* are set to level the read and write timing for each DRAM die 108, or each package 106*ln* and 106*un*, so the read and write timing disparities are hidden from memory host 101. Providing data leveling support on DB components 104 minimizes or eliminates the requisite changes to memory host 101.

A crossbar switch 118 allows DB components 104 to communicate byte-wide data via both link groups DQSxm/DQSym in wide mode, or via only one link group to communicate nibble-wide data in the narrow mode. Selection logic 120 controls the connectivity through crossbar switch 118 and the delays through delay elements 116*ln* and 116*un* responsive to delay-and-nibble select signal DNS from RCD 112. RCD 112 and DB components 104 support a training mode that populates a look-up table LUT 122 with delay settings specific to individual DRAM packages 106 or individual DRAM dies 108. The resultant delay settings support modified package rank timing alignment (PRTA) delay calculations. Selection logic 120 refers to the data-leveling delay values in LUT 122 when communicating data and strobe signals with a given DRAM component or die. The delays derived, stored, and utilized for each DRAM-side package rank or timing rank are then a function of the DRAM-side data nibble in the narrow mode. The PRTA is thus a function of both the selected DRAM-side rank and the selected DRAM-side data nibble.

Figure 2:
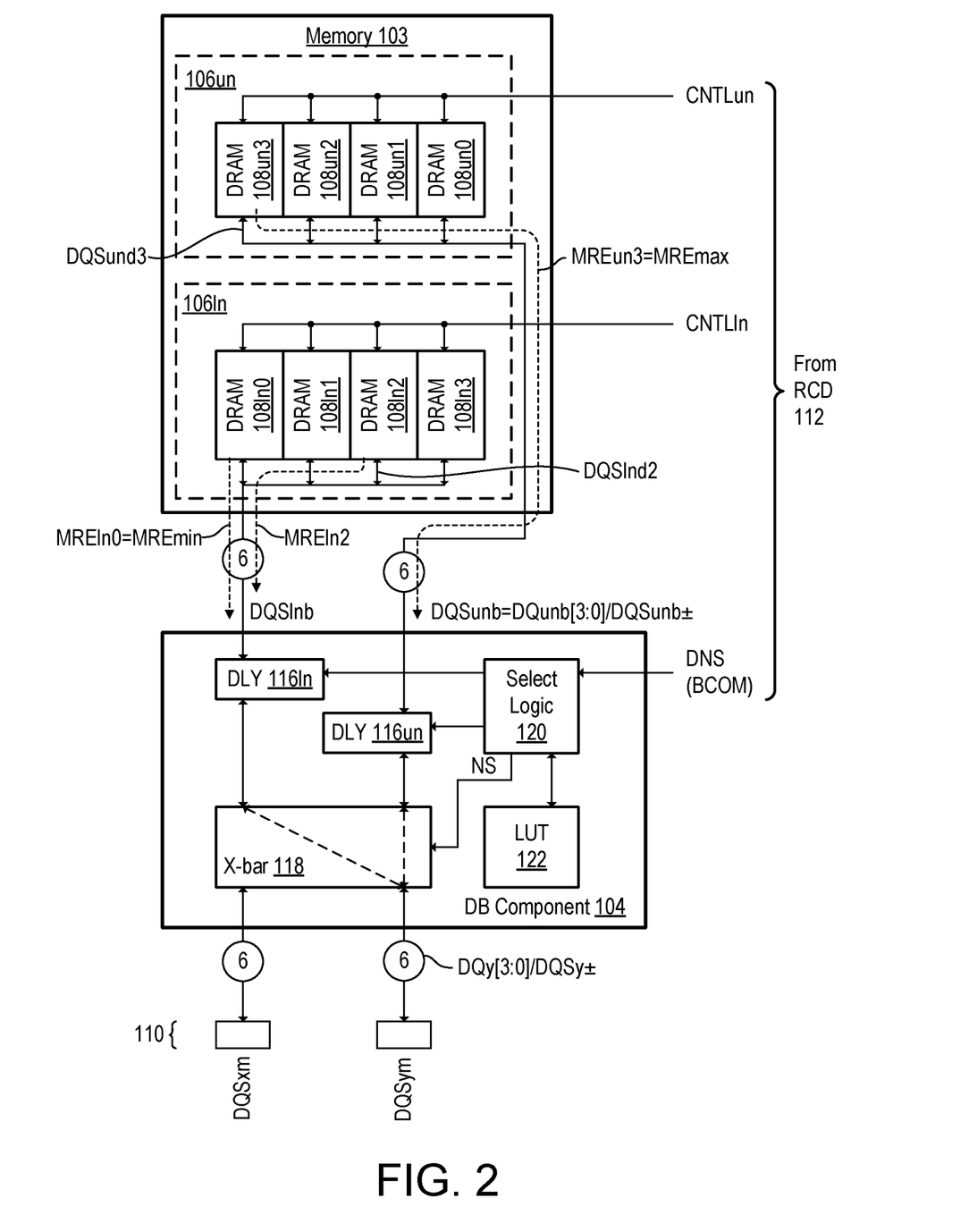
FIG. 2 depicts examples of memory group 103 and DB component 104 of FIG. 1.

FIG. 2 depicts examples of memory group 103 and DB component 104 of FIG. 1, with like-identified elements being the same or similar. DRAM dies 108 are individually designated using suffixes that identify them individually and as members of the upper and lower nibbles. DRAM die 108un0, for example, is die zero of the upper nibble. Dashed lines through crossbar switch 118 indicate that DB component 104 is configured in a narrow, nibble-wide mode in which data is conveyed to and from module connector 110 via nibble-wide data-link group DQSym (i.e., DQym[3:0]/DQSym±). Crossbar switch 118 selects one of two data/strobe signals DQSlnb and DQSunb responsive to a nibble-selection signal NS that selection logic 120 derives from delay-and-nibble selection signal DNS from RCD 112 (FIG. 1). The selected DRAM-side nibble of DB component 104 then communicates with a single DRAM die 108 selected via one of control buses CNTLun and CNTLln from RCD 112.

In this narrow mode, each read or write access selects a single DRAM die 108 in each of the nine memory groups 103 (see FIG. 1). Assuming a read access, for example, RCD 112 receives a read command with address and chip-select and chip-identification information that RCD 112 decodes from a host command to select one DRAM die 108 in each memory group 103, and to instruct all nine DB components 104 to select the appropriate nibble and delay setting for their respective DRAM die 108.

Using DRAM die 108un3 as an example, RCD 112 decodes a read instruction that includes chip-identification (CID) and chip-select (CS) information to assert the requisite address, control, and chip-select signals on module control bus CNTLun. DRAM die 108un3 responsively presents the addressed data and corresponding strobe on port DQSund3 to arrive at DB component 104 after a memory-read-enable delay MREun3 as signal DQSunb3. Delay-select logic decodes signal DNS to (1) select the appropriate data-leveling delay for delay element 116un in LUT 122, and (2) issue the nibble-select signal NS that causes crossbar switch 118 to connect DRAM port DQSunb to module port DQSym. In one embodiment RCD 112 relies upon the most significant bit of an encoded, five-bit chip-select field DCS (not shown) of port DCNTLh from host 101 for nibble selection. Other bits or combinations of bits can be used.

As noted previously, the data and strobe connections for the upper and lower nibbles impose different signal delays. In this example, the data and strobe paths to the individual DRAM dies 108 in each of upper- and lower-nibble packages 106un/106ln are also different, and thus impose different signal delays. The maximum memory-read-enable delay MREmax in this example corresponds to DRAM die 108un3 and is termed MREun3, the suffix "un3" identifying the corresponding die. The minimum memory-read-enable delay MREmin corresponds to DRAM die 108ln0 and is termed MREln0. The remaining MRE delay values fall between these two extremes. In other embodiments packages 106ln and 106un are individually buffered and have matched data traces so that each DRAM die 108 in one package exhibits the same read and write latencies.

DB component 104 imposes programmable delays on data and strobe signals from DRAM dies 108 that offset the different memory-read-enable delays MRE such that the read latencies are the same for each DRAM access from the perspective of memory host 101 (FIG. 1). DRAM die 108un3 thus receives the shortest delay (e.g., the nominal delay imposed by DB component 104), while DRAM die 108ln0 receives the longest delay. The read latencies are thus the same for each DRAM die 108 from the host perspective. DB component 104 likewise imposes die-specific or package-specific write delays to write level data access from the host perspective.

Figure 3:
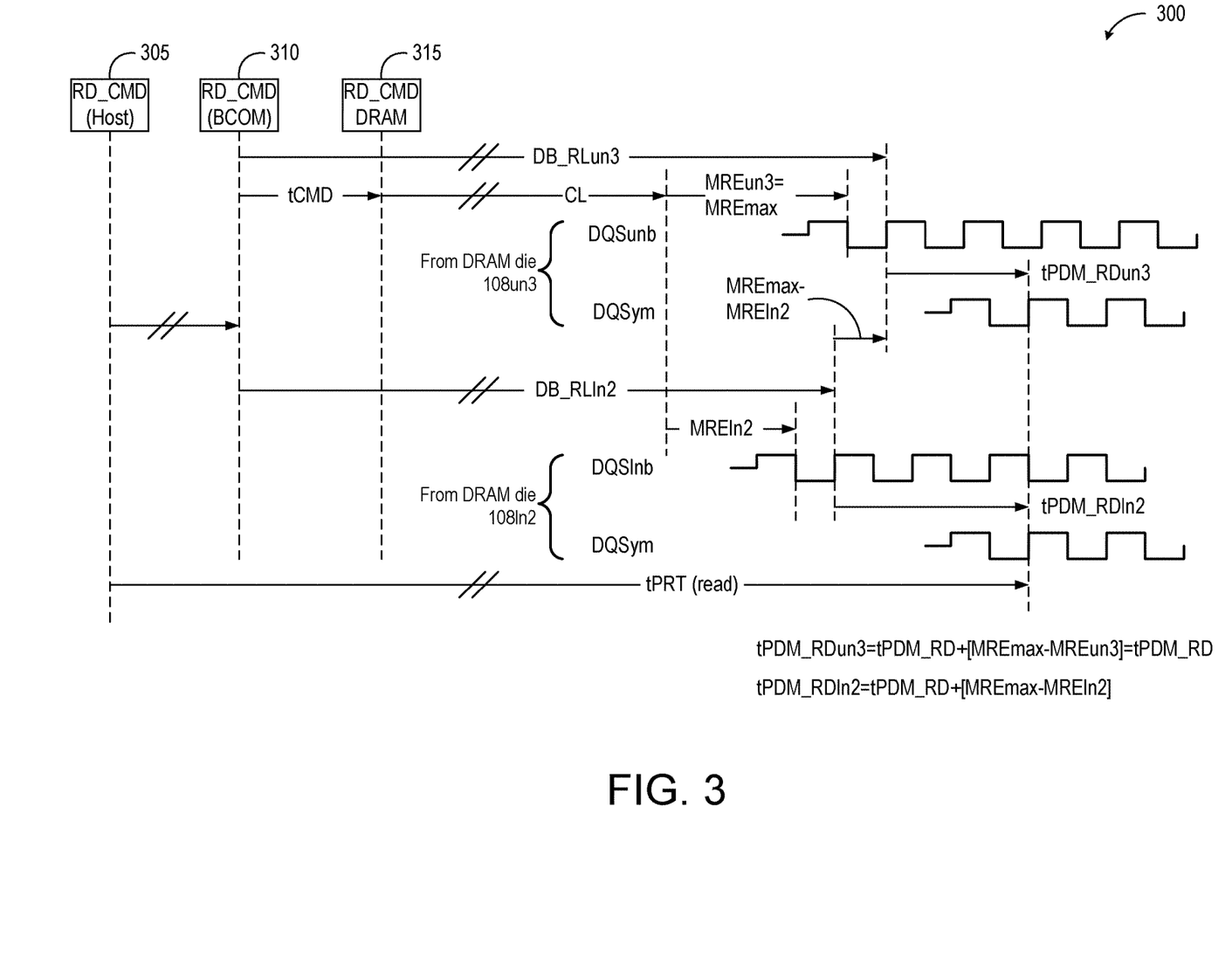
FIG. 3 is a waveform diagram 300 illustrating a pair of read accesses applied to the components of FIG. 2.

FIG. 3 is a waveform diagram 300 illustrating a pair of read accesses applied to the components of FIGS. 1 and 2, one to upper-nibble DRAM die 108un3 and another to lower-nibble DRAM die 108ln2. These accesses are initiated by separate read commands 305 from the host that occur at different times but are shown together with reference to the same read command to illustrate the different data-buffer timings used to read level these accesses. The module control busses CNTLun and CNTLln can also exhibit different delays for packages 106un and 106ln, which are accommodated by the delay calibrations of the training mode; however, these differences are ignored in this example. The depicted signals DQSunb and DQSlnb show the timing of the strobe signals from the selected memory dies, while the two instances of signal DQSym shows the delayed versions of those signals at module connector 110.

In the first example, represented by the top two waveforms DQSunb and DQSym, DB component 104 and a selected rank of DRAM dies 108 sample respective read commands 310 and 315 from RCD 112. RCD 112 issues commands 310 and 315 responsive to read command 305 from memory host 101. Read commands 310 and 315 are sampled at different times relative to command 305, the difference represented by a relative command delay tCMD that can be positive or negative. Due to the fly-by nature of control busses BCOM, CNTLun, and CNTLln, the timing of commands 310 and 315 is different for each nibble. Read command 310 includes signal DNS, encoded on buffer communication bus BCOM, that identifies the nibble and selects the appropriate data-buffer delay.

This first example assumes a read command 315 to DRAM die 108un3. The time from receipt of read command 315 at DRAM die 108un3 to the moment the requested column of data is available on the DRAM die's data output pins is called the column-access-strobe (CAS) latency CL. The subsequent time required for the first falling edge of the strobe signal from DRAM die 108un3 to reach DB component 104, the memory-side read-enable, is a propagation delay MREun3. As measured from the time DB component 104 receives command 310, the requested strobe and read data appear at DB component 104 as signal DBSunb after a data-buffer read latency DB_RLun3. Signal DBSym is then available at the output of DB component 104 after the delay tPDM_RDun3 imposed by DB component 104 with DRAM die 108un3 selected.

As noted in connection with FIG. 2, delay MREun3 is the longest memory-side read-enable delay on offer from the eight DRAM dies 108, and so represents the maximum read-enable delay MREmax (i.e., MREun3=MREmax). This data-leveling delay value is stored in LUT 122. Selection logic 120, responsive to delay and nibble select signal DNS from RCD 112, controls crossbar switch 118 to select the path through delay element 116*un*, looks up a read-data-leveling delay value MREun3 in LUT 122, computes a delay setting for element 116*un*, and passes this setting to delay element 116*un*.

In general, the delay setting for a selected delay element 116 is the difference between delay MREmax and the read-enable delay MRE of the selected DRAM die 108. The delay through DB component 104 is therefore the sum of the nominal buffer-read delay tPDM_RD and the difference between delays MREmax and the read-enable delay MRE of the selected DRAM die 108. In the particular case of a read from DRAM die 108*un*3, the delay through DB component 104 is tPDM_RDun3=tPDM_RD+(MREmax-MREun3). Because delay MREun3 equals MREmax, the delay through delay element 116*un* is set to the shortest interval and DB component 104 imposes the nominal read delay tPDM_RD. The timing of the appearance of signal DQSym at module interface 110, a function of the longest MRE and shortest buffer delay, determines the overall read package rank timing tPRT (read) for module 102.

In the second example, represented by the bottom two waveforms DQSlnb and DQSym, host 101 issues a read-command signal 305 to RCD 112, which responsively issues commands 310 and 315 to DB component 104 and DRAM die 108*ln*2, respectively. Relative command offset tCMD is the same as in the first example, but this is for ease of illustration; in practice, different ranks and dies can experience different relative command delays. The time from receipt of command 315 at DRAM die 108*ln*2 to the presentation of a data and strobe signals on the output of DRAM die 108*ln* is again the column-access latency CL. The subsequent time required for the first falling edge of the strobe signal from DRAM die 108*ln*2 to reach DB component 104, the memory-side read-enable, is a propagation delay MREln2, which is shorter than the maximum delay MREmax. The requested read data appears at DB component 104 as signal DQSunb after a data-buffer read latency DB RLln2 that is a function of delay MREln2.

In this second example, the delay through DB component 104 is the sum of the nominal buffer-read delay tPDM_RD and the difference between delays MREmax and MREln2. Selection logic 120 sets the delay through DB component 104 to tPDM_RDln2=tPDM_RD+(MREmax-MREln2). Delay MREln2 is less than MREmax, so the delay through delay element 116*ln* is set to increase the delay though DB component 104 beyond the nominal read delay tPDM_RD. The delay increase MREmax-MREln2 offsets the inherent additional delay of the slowest data path so that DB component 104 presents signal DQSym after the same read delay, from the host perspective, as the read access of the slowest example. This read delay is here termed the package-rank timing tPRT (read). Read accesses to the other DRAM dies 108 are likewise accommodated to equalize read latencies for read access to each DRAM package or die.

Figure 4:
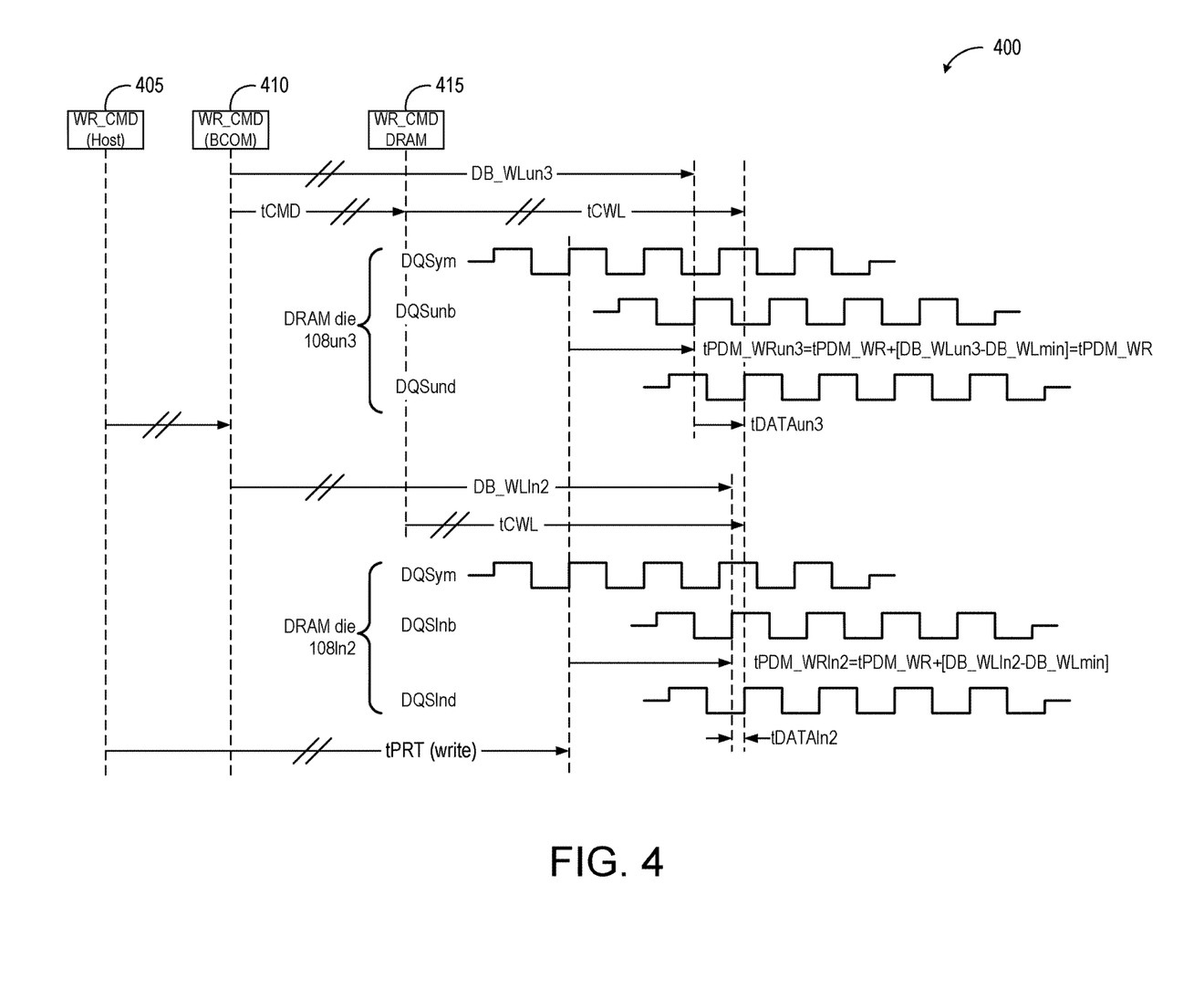
FIG. 4 is a waveform diagram 400 illustrating a pair of write accesses, one to upper-nibble DRAM die 108$un$3 and another to lower-nibble DRAM die 108$ln$2 of FIG. 2.

FIG. 4 is a waveform diagram 400 illustrating a pair of write accesses, one to upper-nibble DRAM die 108*un*3 and another to lower-nibble DRAM die 108*ln*2 of FIG. 2. These accesses are initiated by separate write commands 405 from memory host 101 but are shown together with reference to the same data-buffer write command 410 and DRAM write command 415 from RCD 112 to illustrate the different data-buffer timings used to write-level these accesses. The module control busses CNTLun and CNTLln can also exhibit different delays for packages 106*un* and 106*ln*, but this example ignores such differences. Write command 415 is thus shown to have the same timing for both accesses. DB component 104 selectively adjusts the delays imposed on write data nibbles so that the write timing is the same, from the host perspective, for each accessed DRAM die and collection of dies. Said differently, memory host 101 sees the same package-rank timing tPRT (write) when writing to each timing rank.

In the first example, represented by the top three waveforms, memory host 101 issues a write-command signal 405 to RCD 112, which responsively issues its own write commands 410 and 415. Write command 410, on bus BCOM, conveys delay-and-nibble select signal DNS to DB components 104 to direct the steering and timing of data and strobe signals through DB components 104. Write command 415 selects and accesses data in DRAM die 108*un*3 (and the other dies of the selected rank). Commands 410 and 415 reach their respective destinations at DB component 104 and DRAM die 108*un*3 at times separated by command offset tCMD, which can be positive or negative. The latency from the input of write command 410 at DB component 104 to the appearance of the first rising edge of strobe signal DQSunb at the output of DB component 104 is termed the DB write latency DB_WLun3, and the latency from the input of write command 415 at DRAM die 108*un*3 to the input of the first rising edge of strobe signal DQSund is termed the CAS write latency tCWL. (As in the read example, this diagram focuses on a single DB component 104 and DRAM die 108*un*3, but the remaining DB components and selected rank of DRAM dies 108 are likewise configured.)

The package-rank timing tPRT (write) from the issuance of command 405 to the time the first rising edge of a data strobe arrives at the module is the same for each nibble. Because write command 415 of the first example activates DRAM die 108*un*3 of the upper nibble, data signal DQSym at module connector 110 traverses delay element 116*un* to leave DB component 104 as data signal DQSunb. Selection logic 120 controls delay element 116*un* so that signal DQSunb appears after a delay tPDM_WRun3 from the arrival of signal DQSym at the module. Signal DQSunb arrives at DRAM die 108*un*3 as signal DQSund after a write propagation delay tDATAun3 imposed by the path between DB component 104 and DRAM die 108*un*3. The write buffer delay DWLun3 through DB component 104 is set to tPDM_WRun3=tPDM_WR+[DB_WLun3-DB_WLmin], where tPDM_WR is the nominal buffer delay for writes and DB_WLmin is the minimum DB write latency from command 410. The buffer delay tPDM_WRun3 is set to the nominal delay tPDM_WR for DB component 104 (that is, the value DB_WLun3-DB_WLmin is zero) because the illustration of FIG. 4 assumes the delay between signals DQSunb and DQSund is the longest delay data experienced between a DB component 104 and a respective DRAM die 108. The write delay setting DB_WLun3 is set so that the delay between the arrival of write command 415 and strobe DQSund at DRAM die 108*un*3 satisfies CAS write latency tCWL.

The second example, represented by the lower three waveforms DQSym, DQSlnb, and DQSlnd, is similar to the first except that the data-buffer write delay tPDM_WRln2 is lengthened to account for a shorter delay between a DB component 104 and the respective DRAM die 108. Memory host 101 issues a write-command signal 405 to RCD 112, which responsively issues its own write commands 410 and 415 to DB component 104 and DRAM die 108*ln*2, respectively. Because write command 415 activates DRAM die 108*ln*2 of the lower nibble, strobe signal DQSym traverses delay element 116*ln* to appear as strobe signal DQSlnb after the delay imposed by DB component 104. Selection logic 120 controls delay element 1161*n* so that strobe signal DQSlnb appears after a delay tPDM_WRln2. That same signal arrives later as DQSlnd at DRAM die 108*ln*2 due to the write propagation delay tDATAln2 between DB component 104 and DRAM die 108*ln*2. The write delay through DB component 104 is set to tPDM_WRln2=tPDM_WR+ [DB_WLln2-DB_WLmin]. The buffer delay DB_WLln2 is greater than the minimum delay DB_WLmin because the module data delay imposed on the signal DQSln2 is less than that of DQSun3. The value of write delay setting DB_WLln2 is selected such that the CAS write latency tCWL is satisfied for DRAM die 108*ln*2. The write propagation delays through the DB components 104 for the DRAM dies 108 of the remaining timing ranks can be likewise calibrated to satisfy the CAS write latency tCWL for each DRAM die 108 despite variations in command and strobe/data timings.

Figure 5A:
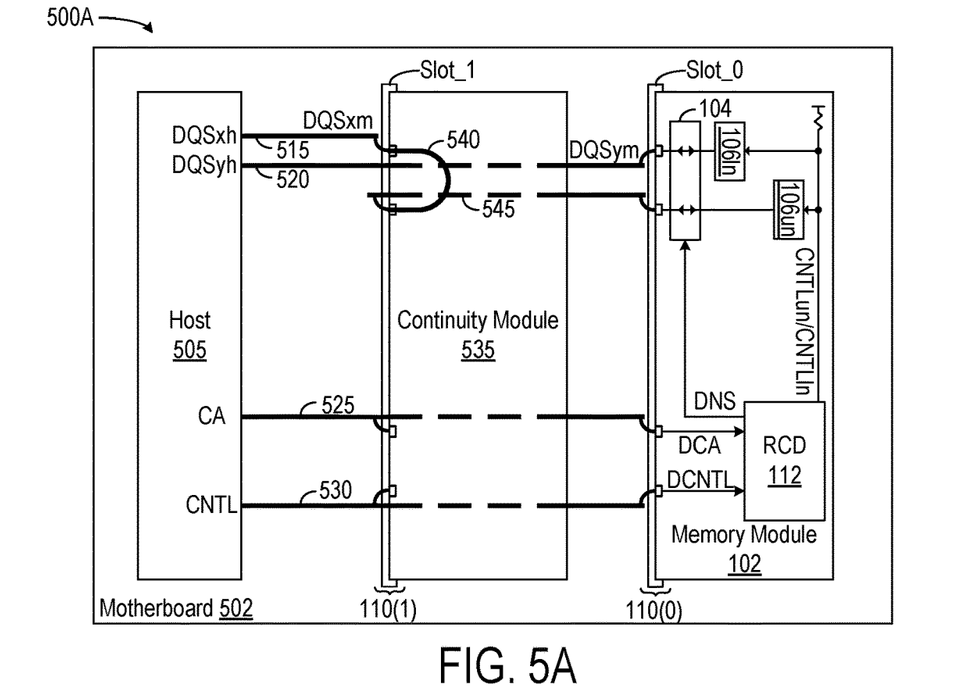
FIG. 5A depicts a memory system 500A in which a motherboard 502 supports a host 505 that communicates with one instance of memory module 102 of FIG. 1.

FIG. 5A depicts a memory system 500A in which a motherboard 502 supports a host 505 (e.g. a memory controller integrated circuit or a processor) that communicates with one instance of memory module 102 of FIG. 1 via data link groups 515 and 520, a command-and-address (CA) link group 525, and a control (CNTL) link group 530. Motherboard 502 includes two memory-module sockets, one of which includes memory module 102 and the other a continuity module 535. Modules 102 and 535 are physically and electrically connected to motherboard 502 via a respective connector Slot_0 and Slot_1. Continuity module 535 includes collections of electrical traces 540 that interconnect link groups 515 from host 505 with motherboard traces 545 that extend between connectors Slot_1 and Slot_0. Alternative names for motherboard 502 include mainboard, system board, or logic board.

Host 505 advantageously communicates with memory module 102 via point-to-point connections. In this full-width example, memory module 102 behaves as a legacy DDR4 LRDIMM, and can communicate with host 505 as would a conventional memory module. Motherboard 502 is also backward compatible with readily available memory modules.

Host 505 communicates command and address signals CA and control signals CNTL to initiate memory transactions (e.g., read and write transactions) with memory module 102. RCD 112 selectively interprets and retransmits these commands, addresses, and control signals to DB component 104 and DRAM packages 106 as needed to respond to the host's requests, facilitating data movement between DRAM packages 106 and module connector 110 via DB components 104. Point-to-point data connections facilitate fast and efficient signaling between host 505 and memory module 102. Memory transactions and point-to-point signaling are familiar to those of skill in the art; a detailed discussion is therefore omitted.

DB component 104 includes two primary data interfaces coupled to respective data link groups 515 and 520 to communicate respective data signals. DB component 104 additionally includes two secondary data interfaces, one to each of the two DRAM packages 106*ln* and 106*un*. Memory module 102 is in a wide mode in this example, in which case RCD 112 causes DB component 104 to communicate eight-bit data from a pair of active DRAM dies, one die in each of DRAM packages 106*ln* and 106*un*. Memory module 102 has nine DB components 104 (see FIG. 1), so host 505 accesses a package rank of eighteen DRAM dies to read and write 72-bit data.

Figure 5B:
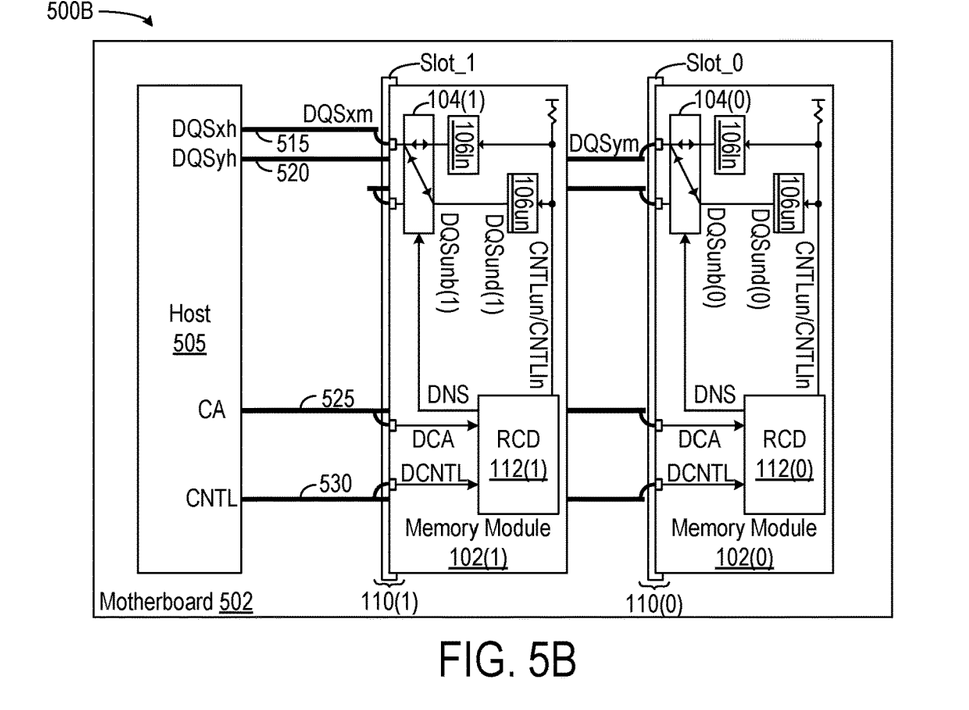
FIG. 5B depicts a memory system 500B in which the same motherboard 502 of FIG. 5A is populated with two memory modules 102(1) and 102(0).

FIG. 5B depicts a memory system 500B in which the same motherboard 502 of FIG. 5A is populated with two memory modules 102(1) and 102(0) in respective connectors Slot_1 and Slot_0, each in the narrow (four-bit) mode. Due to the motherboard connectivity, each module is connected to host 505 via only one of data link groups 515 and 520. Modules 102(1) and 102(0) thus exhibit a lower load on the data link groups than in systems in which two modules share the same data links. Responsive to each memory request from host 505, each of modules 102(1) and 102(0) responds by reading or writing nibble-wide data via each of nine DB components 104. Host 505 thus accesses a package rank of eighteen memory die—a timing rank of nine DRAM dies in each module—to read and write 72-bit data. Dividing each 72-bit package rank into two 36-bit timing ranks doubles the effective number of memory addresses on each module. Modules 102(1) and 102(0) thus collectively provide the same data width and double the addresses of the single-module configuration of FIG. 5A.

In FIGS. 5A and 5B it is assumed that data link groups 515 and 520 operate at or near a maximum practical signaling rate to maximize the data bandwidth between host 505 and the module or modules 102. For both single- and dual-module configurations, the point-to-point connections support these relatively high data rates. The command and control link groups 525 and 530 are point-to-two-point connections that can operate at a lower rate. In either mode both RCD 112 and DB component 104 can be used to level read and write data in the manner detailed previously.

Read and write leveling as detailed above accounts for data and command skew for signals conveyed on a given module. In the dual-module system 500B, data and command signals are additionally skewed due to the different path lengths between host 505 and connectors Slot_1 and Slot_0. Host 505 may support write- and read-leveling calibration, but even so may not have sufficient granularity and ranges of adjustment to perform this compensation. Modules 102(1) and 102(0) are configurable to manage this external skew to level read and write timing differences between modules Slot_1 and Slot_0.

In dual-module memory system 500B, each of RCD 112(1) and 112(0) translates chip select CS and chip ID information from memory host 101 into DRAM-side chip selects and BCOM control signals as detailed above in connection with FIG. 2. Each memory module 102(1) and 102(0) accesses half of the full data width for a write or read event, with each DB component 104(1) and 104(0) providing one host-side data nibble. Each DB component 104(1) and 104(0) switches between two DRAM-side data nibbles to communicate via a single host-side data nibble, with the selected DRAM-side nibble dependent upon a nibble selection control signal DNS from respective RCD 112(1) or 112(0).

As described above in connection with FIGS. 1 and 2, timing-rank management makes use of a modified PRTA mode supported by RCDs 112(1) and 112(0) and DB components 104(1) and 104(0) to level read and write accesses to the DRAM dies 108 of the upper and lower nibbles on each memory module 102(1) and 102(0). In the configuration of FIG. 5B, the PRTA mode is extended to compensate for slot-to-slot command and data skews so that read and write latencies are the same for each module from the host perspective.

Figure 6:
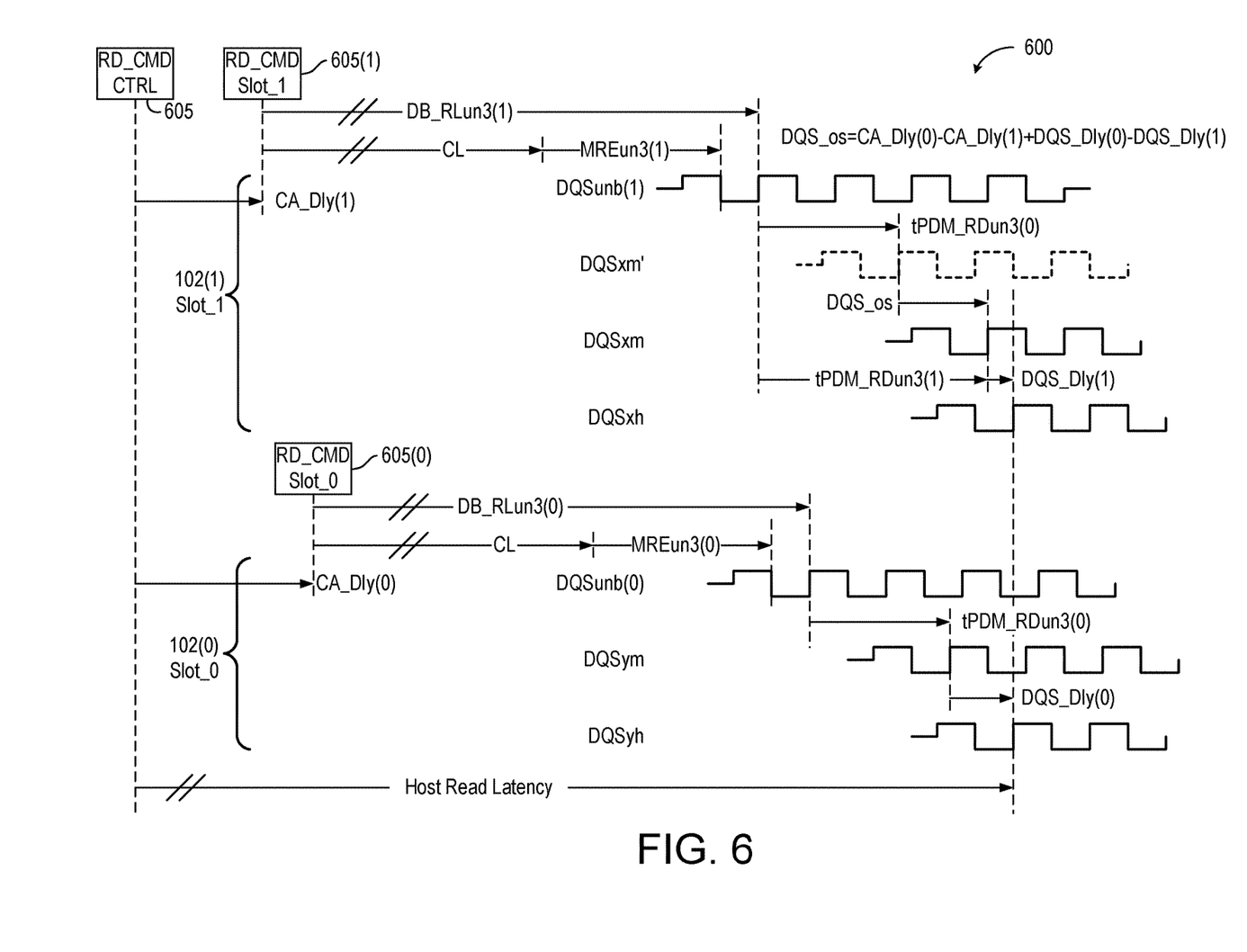
FIG. 6 is a waveform diagram 600 illustrating how de-skew is accomplished for the read case in the dual-module system 500B of FIG. 5B.

FIG. 6 is a waveform diagram 600 illustrating how de-skew is accomplished for the read case in the dual-module system 500B of FIG. 5B. Module 102(0) is farthest from host 505, so command and data signals take longer to propagate. Module 102(0) thus represents the longest read latency from the host perspective. DB component 104(1) of module 102(1) is calibrated to include a data offset DQS_os that matches the read latency of DB component 104(1) to DB component 104(0) so that host 505 perceives the same read latency from both modules.

The illustration of FIG. 6 begins with host 505 issuing a read command 605, which arrives at memory module 102(1) as command 605(1) after a command delay CA_Dly(1), and at memory module 102(0) as command 605(0) after a longer command delay CA_Dly(0). Considering first the lower three waveforms that relate to far memory module 102(0), the requested read data arrives as data and strobe signal DQSunb(0) at DB component 104(0) after a delay of the CAS latency CL plus the memory-read-enable delay MREun3(0) of the upper-nibble DRAM 108un3 (FIG. 2). DB component 104(0) is configured to impose a delay of tPDM_RDun3(0) during the module read leveling detailed above, and the resulting delayed data and strobe signal DQSym arrives at module connector 110(0). This same data and strobe signal ultimately arrives at host 505 as signal DQSyh after a delay DQS_Dly(0) imposed by the relatively long data link group 520. The read timing for this data path, from the most remote DRAM die 108un3 of the most remote memory module 102(0), uses the shortest available delay setting through DB component 104(0), and defines the overall host read latency for dual-module memory system 500B.

Turning now to the upper four waveforms, which relate to memory module 102(1), the read command 605(1) to Slot 1 is assumed to address the same DRAM die 108un3 as on the other memory module 102(0) so that the requested read data arrives as data and strobe signal DQSunb(1) at DB component 104(1) after a delay of the CAS latency CL plus the memory-read-enable delay MREun3(1) of the upper-nibble DRAM 108un3 (FIG. 2). If DB component 104(0) were configured to introduce the same buffer delay tPDM_RDun3(0) as for the other memory module 102(0), as shown as hypothetical signal DQSxm', then the read data would arrive at host 505 before the read data from the other module. Instead, DB component 104(1) is configured to impose an additional offset DQS_os equal to the difference between command delays CA_Dly(0) and CA_Dly(1) plus the difference between data delays DQS_Dly(0) and DQS_Dly(1). If the command and data skews are equal for each slot (i.e., CA_Dly(0)=DQS_Dly(0) and CA_Dly(1)=DQS_Dly(1)), then offset DQS_os is twice the slot-to-slot skew. With offset DQS_os, the data and strobe signals from the selected DRAM die arrive as signal DQSxm at module connector 110(1) timed such that it arrives at host 505 as signal DQSxh contemporaneous with data DQSyh from connector 110(0). Host 505 thus sees the same read latency for both modules.

The write latencies for modules 102(1) and 102(0) are different from the host perspective. However, due to the fly-by nature of the topology, there is no need to introduce a write-latency offset provided the command and data skews between slots Slot_1 and Slot_0 are equal. That is, the data and strobe propagation delays need not be adjusted if both the data and the commands arrive at each of modules 102(0) and 102(1) with the same relative timing. If, however, the command and data skews between slots Slot_0 and Slot_1 do not match, then the delays through the one or both of DB components 104(0) and 104(1) of one of modules 102(0) and 102(1) can be adjusted to compensate for this disparity.

Figure 7:
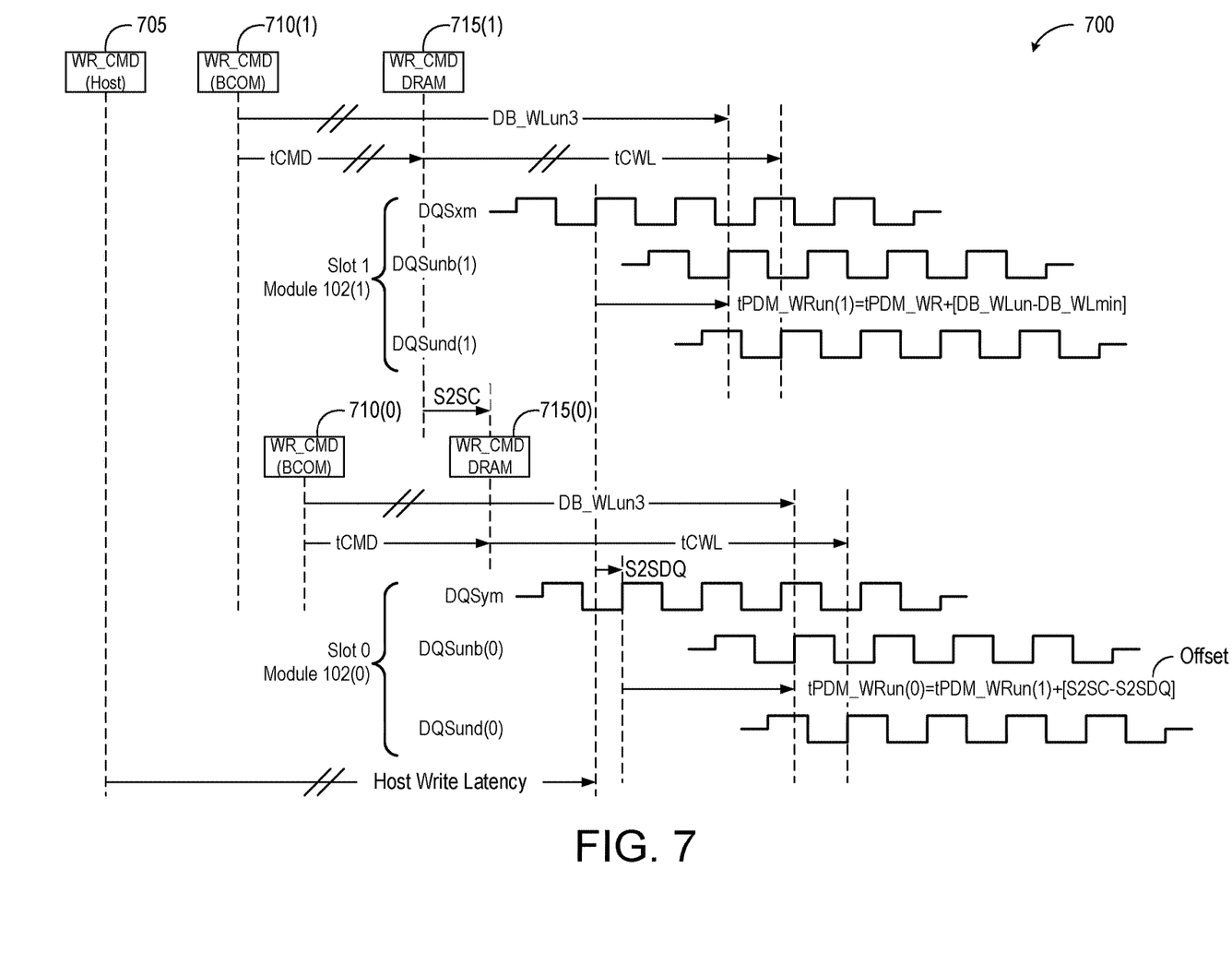
FIG. 7 is a waveform diagram 600 illustrating how de-skew is accomplished for the write case in the dual-module system 500B of FIG. 5B.

FIG. 7 is a waveform diagram 700 illustrating how de-skew is accomplished for the write case in the dual-module system 500B of FIG. 5B. This de-skew allows host 505 to launch data of the same write latency to both slots despite the different propagation delays for commands and data. In this example, the slot-to-slot command skew S2SC (between slots Slot_1 and Slot_0) is greater than the slot-to-slot data skew S2SDQ. Absent adjustment, the commands to slot Slot_0 would arrive too early relative to the data. DB component 104(0) therefore provides a write offset equal to the difference between slot-to-slot data and command skews S2SDQ and S2SC. The host write latency is therefore the same for both modules, the Slot-1 write latency in this example.

The timing for module 102(1) in slot Slot_1 is as detailed in connection with FIG. 4, so a detailed discussion is omitted here. Briefly, host 505 issues a write command 705 to both modules 102(1) and 102(0) via command link group 525. RCDs 112(1) and 112(0) interpret command 705 and issue respective commands 710(1) and 710(0) to DB components 104(1) and 104(0), and respective commands 715(1) and 715(0) to whichever the selected DRAM dies 108 on each module. Due to the slot-to-slot command skew S2SC, commands 710(0) and 715(0) arrive later at their respective destinations than commands 710(1) and 715(1). Data and strobe signals DQSxh and DQSyh (see FIG. 5) issued simultaneously from host 505 arrive first at module 102(1) as signal DQSxm and then, after data skew S2SDQ, at module 102(0) as signal DQSym. An offset S2SC-S2SDQ delays data and strobe signals DQSund(0) so they arrive at the selected DRAM dies timed to the delayed command signal 715(0) to satisfy the CAS write latency tCWL.

In the foregoing description and in the accompanying drawings, specific terminology and drawing symbols are set forth to provide a thorough understanding of the present invention. In some instances, the terminology and symbols may imply specific details that are not required to practice the invention. For example, the memory groups, packages, and dies can be or include other forms of volatile or nonvolatile memory, and multi-conductor signal lines may alternatively be single-conductor signal lines and vice versa. More generally, any of the specific numbers of bits, signal path widths, signaling or operating frequencies, circuits or devices and the like may be different from those described above in alternative embodiments.

While the present invention has been described in connection with specific embodiments, variations of these embodiments will be apparent to those of ordinary skill in the art. For example, some components are shown directly connected to one another while others are shown connected via intermediate components. In each instance the method of interconnection, or "coupling," establishes some desired electrical communication between two or more circuit nodes, or terminals. Such coupling may often be accomplished using a number of circuit configurations, as will be understood by those of skill in the art. Therefore, the spirit and scope of the appended claims should not be limited to the foregoing description. Only those claims specifically reciting "means for" or "step for" should be construed in the manner required under the sixth paragraph of 35 U.S.C. § 112.

What is claimed is:

1. A data-buffer component for buffering data in one of a wide-data mode to communicate a first number of data bits in parallel and a narrow-data mode to communicate a second number of data bits less than the first number of data bits in parallel between a module connector and a first timing rank of memory dies and a second timing rank of memory dies, the data-buffer component comprising:
   a first delay element coupled to the first timing rank of memory dies;

a second delay element coupled to the second timing rank of memory dies; and a switch coupled to the first delay element and the second delay element, the switch to:

alternatively couple one of the first timing rank of memory dies, via the first delay element, and the second timing rank of memory dies, via the second delay element, to the module connector in the narrow-data mode; and couple both of the first timing rank of memory dies, via the first delay element, and the second timing rank of memory dies, via the second delay element, to the module connector in parallel in the wide-data mode.

2. The data-buffer component of claim 1, wherein the switch couples the one of the first timing rank of memory dies and the second rank of memory dies to a data-link group in the narrow-date mode.

3. The data-buffer component of claim 2, wherein the data-link group is nibble-wide.

4. The data-buffer component of claim 1, wherein the switch, in the wide-data mode, couples the first timing rank of memory dies to a first data-link group on the module connector and the second timing rank of memory dies to a second data-link group of the module connector.

5. The data-buffer component of claim 4, wherein the first data-link group is nibble-wide.

6. The data-buffer component of claim 5, wherein the second data-link group is nibble-wide.

7. The data-buffer component of claim 1, further comprising selection logic coupled to the first delay element and the second delay element, the selection logic to select a first delay through the first delay element and a second delay different from the first delay through the second delay element.

8. The data-buffer component of claim 7, further comprising a look-up table coupled to the selection logic, the look-up table to store values indicative of the first delay and the second delay.

9. The data-buffer component of claim 7, the selection logic coupled to the switch to select between the narrow-data mode and the wide-data mode.

10. The data-buffer component of claim 1, wherein the switch comprises a crossbar switch.

11. The data-buffer component of claim 1, further comprising an input port to connect to a buffer-control bus.

12. A method of responding to an address-buffer command to steer first data from a first memory rank and second data from a second memory rank to at least one of a first data-link group and a second data-link group, the method comprising:

receiving a first read command identifying the first memory rank;

looking up a first delay associated with the first memory rank;

receiving the first data from the first memory rank;

communicating the first data to the at least one of the first data-link group and the second data-link group while imposing the first delay on the first data;

receiving a second read command identifying the second memory rank;

looking up a second delay associated with the second memory rank;

receiving the second data from the first memory rank; and communicating the second data to the at least one of the first data-link group and the second data-link group while imposing the second delay on the second data.

13. The method of claim 12, further comprising, in a narrow-data mode, communicating the first data to the first data-link group and the second data to the first data-link group.

14. The method of claim 12, further comprising, in a wide-data mode, communicating the first data to the first data-link group and the second data to the second data-link group.

15. The method of claim 14, further comprising calibrating the first delay and the second delay to phase align the first data at the first data-link group with the second data at the second data-link group.

16. The method of claim 12, wherein the first data-link group is nibble-wide.

17. The method of claim 16, wherein the second data-link group is nibble-wide.

18. A data-buffer component for buffering data in one of a wide-data mode to communicate a first number of data bits in parallel and a narrow-data mode to communicate a second number of data bits less than the first number of data bits in parallel between a module connector and a first timing rank of memory dies and a second timing rank of memory dies, the data-buffer component comprising:

a first delay element coupled to the first timing rank of memory dies;

a second delay element coupled to the second timing rank of memory dies; and means for alternatively coupling one of the first timing rank of memory dies, via the first delay element, and the second timing rank of memory dies, via the second delay element, to the module connector in the narrow-data mode; and for coupling both of the first timing rank of memory dies, via the first delay element, and the second timing rank of memory dies, via the second delay element, to the module connector in parallel in the wide-data mode.

19. The data-buffer component of claim 18, wherein the means for alternatively coupling one of the first timing rank of memory dies and the second rank of memory dies to the module connector connects the one of the first timing rank of memory dies and the second rank of memory dies to a data-link group.

20. The data-buffer component of claim 19, wherein the data-link group is nibble-wide.

* * * * *